Oct. 18, 1927.
J. E. BECKER
1,645,892
TRAILER STEERING DEVICE
Filed Aug. 9, 1926    3 Sheets-Sheet 3
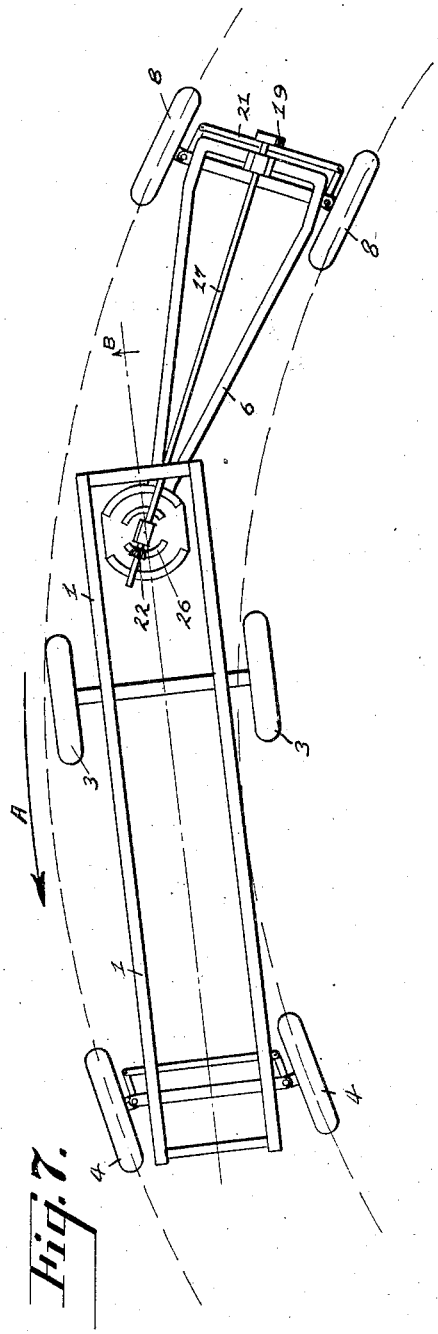
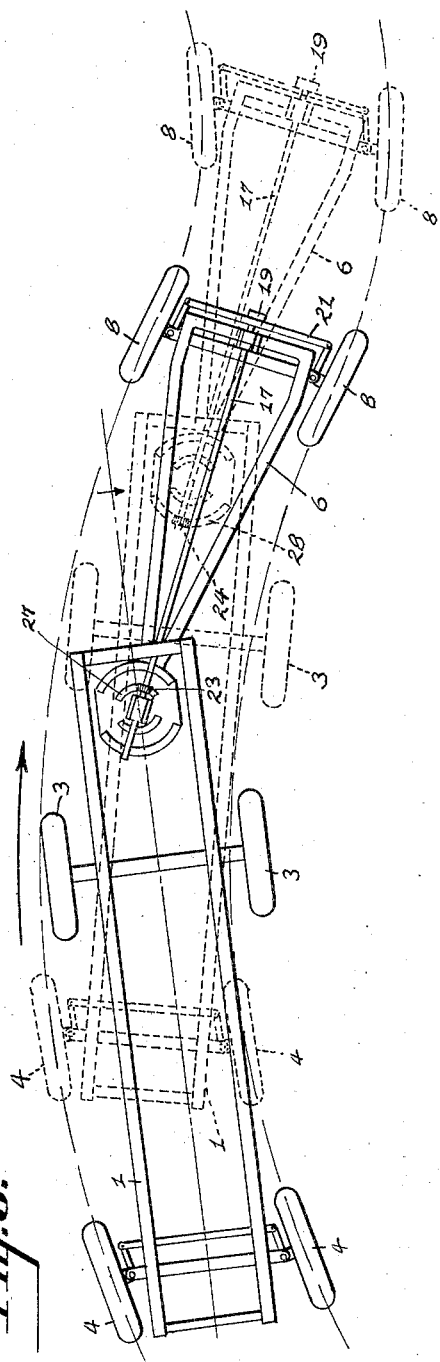
INVENTOR
J. ERNEST BECKER
BY
ATTY.

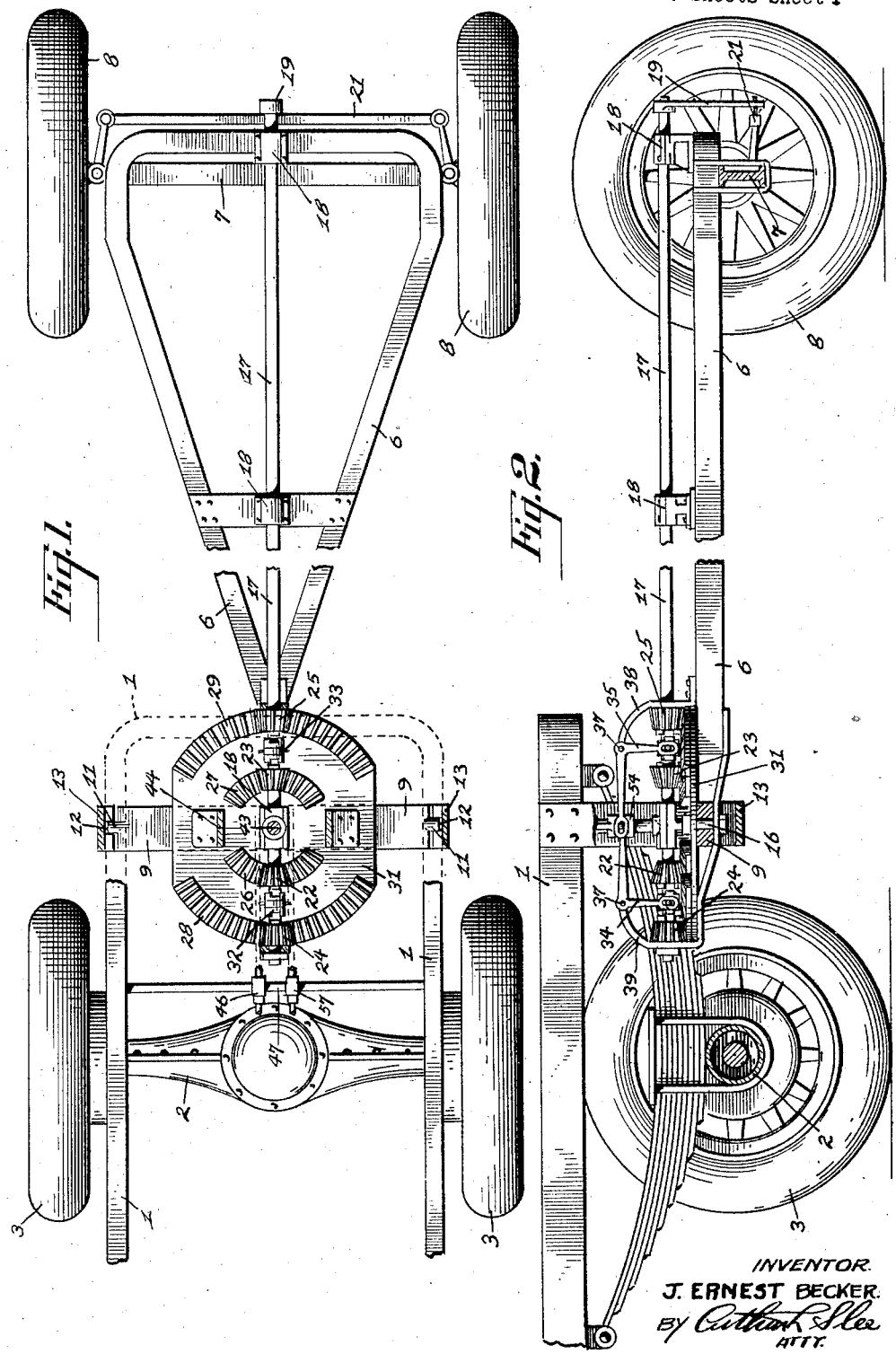
Oct. 18, 1927. 1,645,892
J. E. BECKER
TRAILER STEERING DEVICE
Filed Aug. 9, 1926   3 Sheets-Sheet 1
INVENTOR.
J. ERNEST BECKER.

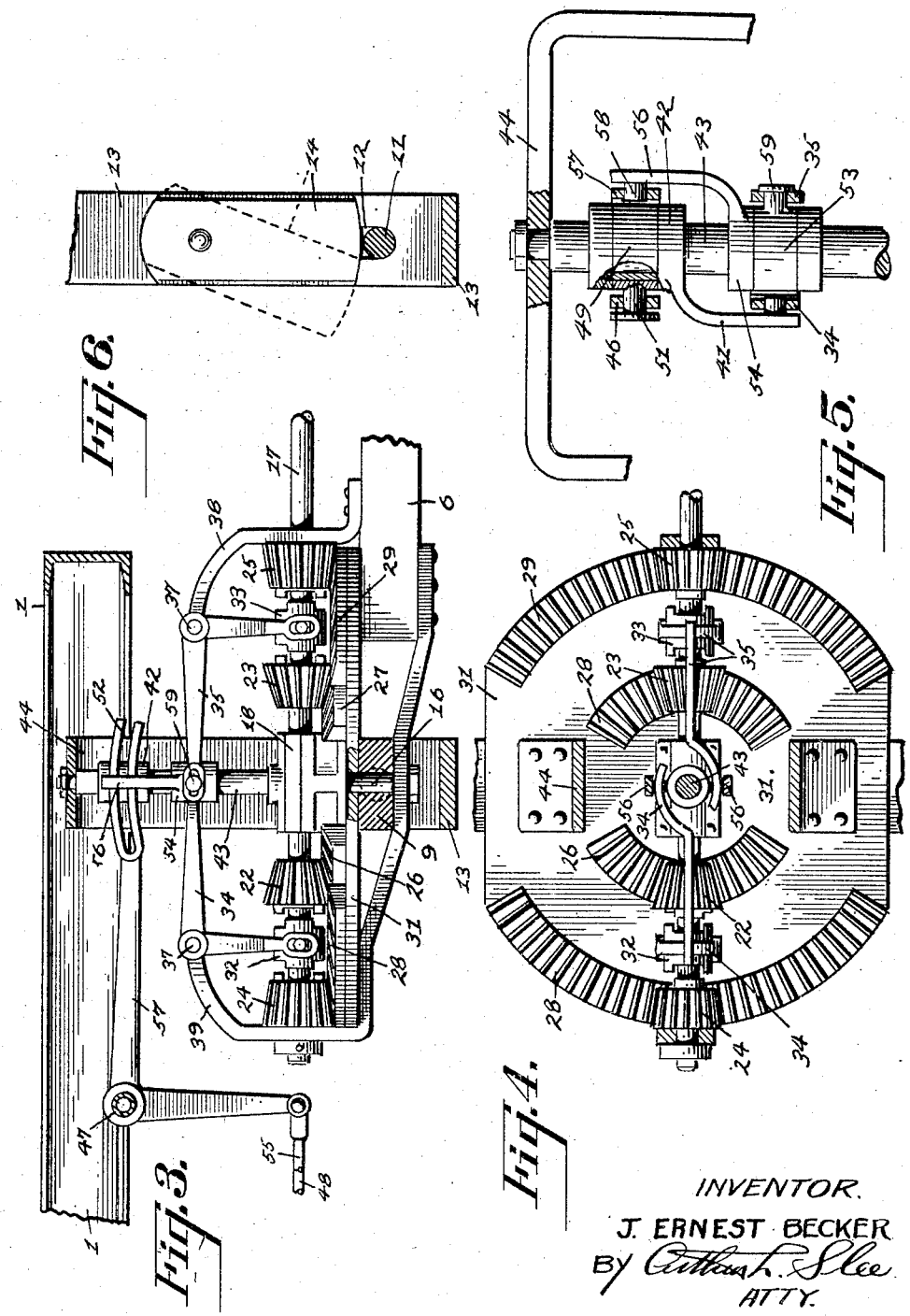

Patented Oct. 18, 1927.

1,645,892

UNITED STATES PATENT OFFICE.

JOSEPH ERNEST BECKER, OF SAN FRANCISCO, CALIFORNIA.

TRAILER-STEERING DEVICE.

Application filed August 9, 1926. Serial No. 128,181.

My invention relates to improvements in steering devices for vehicle trailers whereby the steering wheels of a trailer are automatically actuated by the relative pivotal body movement of the vehicle when driven along a curvilinear course to cause the trailer to track with the vehicle.

The primary object of my invention is to provide a new and improved steering mechanism for vehicle trailers.

Another object is to provide a new and improved device of the character described whereby the steering wheels of a trailer are caused to automatically track with the wheels of a vehicle when driven either forwardly or rearwardly.

A further object is to provide an improved mechanism which will facilitate the backing up and turning of a vehicle and trailer.

Another object is to provide an improved device whereby the steering wheels may be moved to varying degrees to vary the turning radius of the trailer and vehicle.

A further object is to provide improved steering mechanism for steering a trailer in the same or in opposite direction relative to the turning movement of the vehicle whereby the vehicle and trailer may be backed along a compound curve and to facilitate the manipulation of the vehicle and trailer in restricted areas.

Another object is to provide an improved steering mechanism which will normally hold the trailer and vehicle in trailing relation and which will prevent side sway of the trailer relative to the vehicle when in motion.

Another object is to provide improved means for selectively adjusting the mechanism to steer the trailer in a desired direction and at a desired rate.

A further object is to provide an improved steering mechanism wherein a plurality of actuating gears are arranged to be selectively engaged for operating the steering mechanism in a desired manner.

A further object is to provide improved means for shifting the steering mechanism and arranged to operate in a manner adapted to prevent the relative movement of the vehicle and trailer from affecting the shifting means and arranged to operate efficiently independently of the angle between the vehicle and trailer.

A still further object of the invention is to provide improved mechanism of the character described which may be detachably connected in a simple and efficient manner so as to facilitate the coupling and uncoupling of the trailer from the vehicle, and in which the shifting levers may be permanently carried upon the vehicle and easily and efficiently connected with the steering mechanism when the trailer is coupled to the vehicle.

I accomplish these and other objects by means of the improved device disclosed in the drawings forming a part of the present application wherein like characters of reference are used to designate similar parts throughout the specification and drawings, and in which, Fig. 1 is a broken plan view of the rear portion of a motor vehicle and a trailer disclosing a portion of my improved steering device and the manner in which it is applied.

Fig. 2 is a broken side elevation of the device as shown in Fig. 1, with the near wheels of the trailer and vehicle removed.

Fig. 3 is an enlarged broken side elevation, partly in section, of the steering connections.

Fig. 4 is an enlarged broken plan view, partly in section, of said connections.

Fig. 5 is a still farther enlarged broken detail of a portion of the gear shifting mechanism.

Fig. 6 is an enlarged detail view of the means for detachably locking the draw bar of the trailer in pivotal connection with the vehicle.

Figs. 7 and 8 are diagrammatic views showing the manner in which the trailer is steered to track with the vehicle.

Referring to the drawings, the numeral 1 is used to designate in general the body of a vehicle such as a motor truck or the like, said body extending rearwardly in overhanging relation to a rear axle 2 carrying the rear wheels 3 of the vehicle. Front wheels 4 are mounted upon the forward end of the body and arranged to be moved pivotally in the well known manner for steering the vehicle. The rearwardly extending portion of the body overhanging the rear axle 2, hereinafter referred to as the overhang, is arranged to be connected to a draw bar 6 connected to the axle 7 of a suitable trailer to be drawn by the vehicle, said trailer being provided with wheels 8 mounted for pivotal movement for steering the trailer in a manner analogous to the mounting the of the front wheels 4 of the vehicle. The trailer may be either two-wheeled or four-wheeled, but as the front or steering wheels of a four-wheeled trailer only are acted upon directly by my steering device, I have illustrated only a single axle and pair of wheels which may be regarded either as a two-wheeled trailer or as the front wheels and axle of a four-wheeled trailer.

The draw bar 6 is detachably connected to the overhang of the body 1 of the vehicle by means of a transverse bar 9 provided with trunnions 11 engaging bearing recesses 12 formed in opposite sides of a yoke 13 extending across the rearward end of the body 1 and secured to said body in any suitable manner. The trunnions 11 are held in engagement with the bearing recesses 12 by means of latch member 14 pivotally secured upon the side members of the yoke and arranged to swing into parallel relation with said sides to close the open upper ends of the recesses 13, as shown in Fig. 6 of the drawings. The draw bar 6 is pivotally engaged by a king pin 16 carried by the bar 9. The king pin 16 permits a transverse pivotal movement of the draw bar relative to the body 1 of the vehicle and the trunnions 11 permit a vertical pivotal movement of said draw bar relative to said body, whereby said draw bar may swing horizontally and vertically to accommodate the necessary movement of the draw bar when the trailer is connected to the vehicle.

The trailer steering mechanism consists of a shaft 17 mounted upon the draw bar 6 by means of suitable bearings 18, the rearward end of said bar being provided with an arm 19 engaging the steering reach rod 21 connecting the wheels 8 of the trailer whereby the swinging movement imparted to said arm will operate to turn the wheels 8 upon their mounting spindles when the shaft 17 is partially rotated as hereinafter more fully described.

The forward end of the shaft 17 is provided with a plurality of gears 22, 23, 24 and 25, rotatable upon the shaft 17 and normally meshing with ring gear segments 26, 27, 28 and 29 mounted upon a plate 31 secured upon the transverse bar 9. The ring gear segments are arranged concentrically with the king pin 16 upon the forward and rearward sides thereof, said segments being of sufficient length to maintain meshing relation with the gears when the draw bar is swung to either extreme of pivotal movement upon the king pin 16.

Clutch members 32 and 33 are feathered upon the shaft 17 between the gears 22 and 24, and the gears 23 and 25 respectively, said clutch members being independently movable to engage either adjacent gear whereby said gear may be locked to the shaft for rotating the same. The clutch members 32 and 33 may be actuated in any suitable manner, preferably by means of bell cranks 34 and 35 pivotally mounted as at 37 upon brackets 38 and 39 secured upon the draw bar 6.

The bell crank 34 is pivotally and slidably connected at one end to the clutch member 32 and at the other end upon an arm 41 extending downwardly from a sleeve 42 slidably mounted upon a vertically disposed shaft 43 extending upwardly co-axially with the ring gear segments. The lower end of the shaft 43 is secured upon a bearing block 18 and the upper end is secured upon a yoke 44 extending upwardly above the bar 9, said shaft 43 being arranged to be moved with the bar 9 and ring gear segments secured thereto. The sleeve 42 is actuated by means of a bell crank 46 pivotally mounted upon the vehicle body 1 as at 47 and arranged to be actuated by a shifting rod 48. The bell crank 46 is connected to the sleeve 42 by means of a collar 49 rotatable upon the sleeve 42 and provided with a laterally extending pin 51 arranged to be engaged within a slot 52 formed in the crank 46, the collar 49 being held against rotation by means of said crank 46 and pin 51 while the sleeve 43 is rotated therein with the shaft 43. The slotted arm of the crank 46 is made arcuate to accommodate the pivotal movement of the shaft 43 and the draw bar 6 upon the trunnions 11, and the arm of the bell crank 34 engaged by the extension 41 is curved concentrically with the shaft 43 whereby engagement is maintained regardless of the pivotal movement of the draw bar relative to the vehicle body.

The bell crank 35 is connected at one end to the clutch member 33 and at the other end to a collar 53 rotatably mounted upon a sleeve 54 slidably mounted upon the shaft 43. The sleeve 54 is provided with an upwardly disposed extension 56 arranged opposite the extension 41, said extension 56 being connected to a bell crank 57 mounted upon the vehicle body and actuated by a rod 55 in a manner similar to the bell crank 46, said crank 57 being provided with an arcuate slot engaging a pin 58 carried by the extension 56 and arranged to hold the sleeve 54 against rotation with the shaft 43. The bell crank 35 is curved concentrically with the shaft 43 to maintain engagement with a pin 59 carried by the collar 53 regardless of the pivotal movement of the crank arm with the trailer draw bar.

The bell cranks 46 and 57 are selectively operated to shift the clutch mechanism associated therewith in either direction by means of a selective lever, not shown, mounted adjacent the driver's seat and operating the rods 48 and 55 in a manner fully analogous to the ordinary shifting mechanism provided for shifting gears of motor vehicle transmissions, and a detailed disclosure of such well known mechanism is herein unnecessary.

The draw bar 6 is pivotally connected to the transverse bar 9 and the plate 31 together with the ring gear segments carried thereby and the clutch operating bell cranks 34 and 35 together with their actuating connections carried by the shaft 43 are all carried by and as a part of the draw bar. The shifting bell cranks 46 and 57 and their actuating connections are permanently mounted upon the vehicle body. In coupling the trailer to the vehicle, the latch members 14 are swung to the position indicated in dotted lines in Fig. 6 of the drawings. The transverse bar 9 is then placed with the trunnions 11 in engagement with the bearing recesses 12 and the latches returned to locking position. When moving the bar 9 into coupling position, the pins 51 and 58 are moved into the open ends of the slots formed in the bell cranks 46 and 57, thereby obtaining an operative connection between the shifting mechanism and the steering mechanism.

In operation my improved trailer steering device is as follows:—Assuming the trailer coupled to a motor vehicle as above described and the vehicle and trailer to be alined along a straight course, the steering gear mechanism is shifted to cause the gear 22 to be locked to the shaft 17 and the ring gear segment 26 rendered operative for steering the trailer. This position, hereinafter referred to as the normal forward driving position, results in the following operations:

So long as the trailer and vehicle remains in longitudinal alinement, the gear 22, meshing with the segment 26 and locked to the shaft 17 by means of the clutch member 32, operates to prevent rotation of the shaft 17, thereby holding the arm 19 rigidly in a position such that the steering wheels of the trailer are held in alinement with the wheels of the vehicle and the trailer will be caused to track accurately with the vehicle so long as the vehicle is driven along a rectilinear course, thus preventing the dangerous swaying frequently occurring when a trailer is pulled along a rough or uneven road.

When the vehicle is driven along a curvilinear course, as around curves occurring in a highway, the turning of the vehicle upon the curve causes the overhang of the body 1 to turn pivotally with respect to the axis of the king pin 16 through which the trailer is being pulled along. This relative pivotal movement is imparted to the ring gear segments which are thus removed relatively to the gears and caused to partially rotate the same. The gear 22, when it is engaged by its clutch member 32, causes a corresponding partial rotation of the shaft 17, which in turn moves the lever arm 19 and causes the steering wheels of the trailer to be pivotally turned to track with the vehicle as it is driven along the curvilinear course. The relative movement and the manner in which the trailer is steered for normal forward driving is illustrated diagrammatically in Fig. 7 of the drawings. When driven along a straight course, the center line of the vehicle and the center line of the trailer will coincide. When moving forwardly around a curve to the left, as indicated by the arrow A, the center line of the vehicle is moved in the direction indicated by the arrow B, the angular displacement causing a partial rotation of the gear 22 and shaft 17 whereby the trailer wheels are turned to the right with respect to the axle of the trailer and said wheels are caused to accurately track with the wheels of the vehicle along the course indicated in broken lines. After completing the curve, the body will swing back into alinement, thereby causing the gear 22 to be rotated in the reverse direction and the wheels of the trailer returned to alinement with the wheels of the vehicle. When the curve is toward the right, the movement is in the direction opposite to that indicated in Fig. 7 and the trailer will be steered in a corresponding direction. The ratio between the gear 22 and the ring segment 26 is designed with respect to the length of body, overhang, spindle leverage, and other factors determinable for any particular size and type of vehicle to obtain an accurate tracking of the trailer during normal forward driving.

When it is desired to have the vehicle and trailer travel rearwardly along a course, the gear shifting mechanism is operated to lock gear 23 to the shaft 17 and thereby render the segment 27 operative for actuating the steering mechanism for normal rearward motion. When the movement is along a rectilinear course the segment and gear operate to hold the trailer wheels in alinement with the vehicle wheels and the trailer and truck may be readily backed up. When moving rearwardly upon a turn, the swinging of the body causes the segment 27 to partially rotate the gear 23 and shaft 17 and thereby operate to turn the steering wheels of the trailer.

It will be noted that the normal forward driving segment 26 and the normal rearward driving segment 27 are upon longitudinally opposite sides of the king pin 16 about which the draw bar swings, thereby causing a corresponding movement of the body 1 relative to the draw bar 6 to cause the steering wheels of the trailer to be turned in opposite directions. Thus when driving forwardly, with the gear 22 in operative relation, the movement of the body toward the right causes the gear 22 and shaft 17 to be rotated toward the left whereby the arm 19 is swung toward the left and the steering wheels caused to be inclined toward the right as shown in Fig. 7. When backing along the same curve as shown in Fig. 7, the wheels of the vehicle and trailer must be caused to occupy the same relative positions. This movement of the body now, however, is toward the left. Under such conditions the gear 22 would turn the shaft toward the right and the wheels of the trailer would be shifted in the wrong direction. By engaging the gear 23 however, the direction of rotation of the shaft 17 is reversed and the wheels are turned to the same tracking relation as shown in full lines in Fig. 8 of the drawings.

Should the course be around a compound curve as indicated in Fig. 8, the trailer is steered during forward movement by merely leaving the normal forward driving gear 22 in operative relation, said gear being oscillated back and forth in proportion to the body movement of the vehicle and the trailer is automatically steered to track with the vehicle. When backing, however, the gears must be shifted to reverse the inclination of the trailer wheels while traversing the curve. To accomplish this the normal backing gear 23 is disengaged and a forward driving gear is engaged to rotate the shaft 17 and turn the wheels in an opposite direction to the normal rearward action.

The normal straightening of the vehicle and trailer into alinement while moving rearwardly along the compound curve indicated in Fig. 8 would normally only cause the wheels of the trailer to be returned to alining relation to the vehicle wheels. To direct the movement around the compound curve it is therefore necessary that the steering wheels of the trailer be moved through a wider angle than would result from the operation of the gear 22 and segment 26. To accomplish this the gear 24 is rendered operative. The outer segment 28 is then operative to rotate the shaft 17, and as the segment 28 is of greater radius than the segment 26, the gear 24 and shaft 17 will be rotated through a correspondingly greater degree whereby the steering wheels of the trailer are shifted to the degree necessary to negotiate the turn as indicated in dotted lines in Fig. 8.

From the above explanation it will be seen that for normal forward or rearward driving the gears 22 and 23 are engaged respectively, and by the use of said gears the trailer is automatically steered to track with the vehicle. When an increased degree of movement is necessary, as when making a compound turn rearwardly as above described, and when manipulating the vehicle and trailer within a restricted area as in turning around or in drawing or backing the vehicle and trailer against a curb or loading platform, the gear 24 or 25 may be engaged to obtain an increased degree of movement in a desired direction whereby the trailer may be readily caused to move along a desired course or to a desired position.

My improved steering mechanism, by causing the trailer to automatically track with the vehicle reduces the radius upon which the vehicle and trailer may be turned and thereby avoids congesting traffic and insures against damage due to the cutting in of the trailer while rounding a turn. It also eliminates all side sways of the trailer and thereby removes a dangerous hazard to traffic. In addition to this my device is of particular value in the logging industry, because of the saving effected in road construction. Logging roads heretofore have commonly required a wide clearance upon turns in order to take care of the cutting in of the trailers. As the roads are commonly cut in mountainous country and are of only a temporary nature, this involves a heavy extra expense which is entirely avoided by causing the trailer to accurately track with the vehicle, as shown described.

While I have illustrated and described what I now regard as the preferred form and construction of my invention, the device is, of course, subject to modification in numerous ways without departing from the spirit of my invention. I, therefore, do not wish to restrict myself to the specific construction illustrated and described, but desire to avail myself of all modifications which may fall within the scope of the appended claims.

Having thus described my invention what I claim as new and desire to secure by Letters Patent is:

1. A trailer steering mechanism arranged to be connected between a vehicle and trailer, each having pivotally movable steering wheels, said mechanism comprising means connected between the vehicle and trailer for pivotally moving the steering wheels of the trailer to track with the steering wheels of the vehicle when said vehicle is driven either forwardly or rearwardly along a curvilinear course; and means for increasing the normal degree of turning of the trailer wheels relative to the turning of the vehicle to vary the course of said trailer.

2. A trailer steering mechanism arranged to be connected between a vehicle and trailer, each having pivotally movable steering wheels, said mechanism comprising means connected between the vehicle and trailer for pivotally turning the steering wheels of the trailer in the same manner or in opposite direction relative to the turning of the steering wheels of the vehicle when said vehicle is driven forwardly or rearwardly along a curvilinear course; and means for varying the movement of the trailer wheels relative to the turning of the wheels and body of the vehicle.

3. A trailer steering mechanism comprising a draw bar arranged to be connected between a vehicle and trailer each having pivotally moving steering wheels; a shaft mounted in connection with the draw bar and connected to the steering wheels of the trailer for pivotally turning said wheels; and gear means connected between the body of the vehicle and the shaft and arranged to be actuated by the body movement of the vehicle when steered along a curvilinear course to rotate the shaft whereby the trailer may be automatically caused to track with the vehicle; and means for varying the degree of rotation of the shaft and the resulting movement of the trailer wheels relative to the turning of the body and wheels of the vehicle.

4. A trailer steering mechanism comprising a draw bar arranged to be connected between a vehicle and trailer each having pivotally movable steering wheels; a shaft mounted in connection with the draw bar and connected to the steering wheels of the trailer for pivotally turning said wheels; a plurality of gears mounted upon the shaft; and selective means mounted in connection with the body of the vehicle and arranged to actuate the gears, and thereby rotate the shaft in a desired direction whereby the trailer is automatically steered to track with the vehicle when said vehicle is driven forwardly or rearwardly along a curvilinear course.

5. A trailer steering mechanism comprising a draw bar arranged to be connected between a vehicle and trailer each having pivotally movable steering wheels; a shaft mounted in connection with the draw bar and connected to the steering wheels of the trailer for pivotally turning said wheels; a plurality of gears mounted upon the shaft; and selective means mounted in connection with the body of the vehicle and actuated by the turning movement thereof when the vehicle is steered along a curvilinear course for actuating a desired gear to rotate the shaft to turn the steering wheels of the trailer in a desired direction and to a desired degree whereby the trailer is automatically steered to track with the vehicle when driven forwardly or rearwardly.

6. A trailer steering mechanism comprising a draw bar arranged to be connected between a vehicle and trailer each having pivotally movable steering wheels; a shaft mounted in connection with the draw bar and connected to the steering wheels of the trailer for pivotally turning said wheels; a plurality of gears mounted upon the shaft; a plurality of ring gear segments mounted upon the body of the vehicle and arranged to mesh with the gears, said segments being arranged to move with the body to actuate the gears and shaft when the vehicle is steered along a curvilinear course; and selective means for rendering a desired gear operative for rotating the shaft whereby the steering wheels of the trailer may be moved automatically in a desired direction and to a desired degree when the vehicle is driven forwardly or rearwardly.

7. A trailer steering mechanism comprising a draw bar arranged to be connected between a vehicle and a trailer each having pivotally movable steering wheels; a shaft mounted in connection with the draw bar and connected to the steering wheels of the trailer for pivotally turning said wheels; a plurality of gears mounted upon the shaft; a like plurality of ring gear segments mounted upon the body of the vehicle and arranged to mesh with the gears, said segments being arranged to move with the body to actuate the gears and shaft when the vehicle is steered along a curvilinear course; clutches mounted upon the shaft adjacent the gears; and selective means for moving a desired clutch into engagement with a desired gear for rotating the shaft whereby the steering wheels of the trailer may be moved automatically in a desired direction and to a desired degree when the vehicle is driven forwardly or rearwardly.

8. A trailer steering mechanism comprising a draw bar connected to a trailer and pivotally connected to a king pin carried by a vehicle, said trailer and vehicle each having pivotally movable steering wheels; a shaft mounted in connection with the draw bar and connected to the steering wheels of the trailer for pivotally turning said wheels; a plurality of gears mounted upon the shaft; a like plurality for ring gear segments mounted upon the vehicle concentric with the king pin and arranged to mesh with the gears, said segments being arranged to move with the body relative to the draw bar and shaft to actuate the gears and shaft when the vehicle is driven along a curvilinear course; clutches mounted upon the shaft adjacent the gears; and selective means for actuating a desired clutch to engage a desired gear for rotating the shaft whereby the steering wheels of the trailer may be moved automatically in a desired direction and to a desired degree when the vehicle is driven forwardly or rearwardly.

9. A trailer steering mechanism comprising a draw bar connected to a trailer and pivotally connected to a king pin carried by a vehicle, said trailer and vehicle each having pivotally movable steering wheels; a shaft mounted in connection with the draw bar and connected to the steering wheels of the trailer for pivotally moving said wheels; a plurality of gears mounted upon the shaft; a like plurality of ring gear segments mounted upon the vehicle concentric with the king pin and arranged to mesh with the gears, said segments being arranged to move with the body relative to the draw bar and shaft to actuate the gear and shaft when the vehicle is driven along a curvilinear course; clutches mounted upon the shaft adjacent the gears; and selective means engaging the clutches and arranged to actuate a desired clutch to engage a desired gear independently of the angle between the draw bar and vehicle whereby the shaft may be rotated and the steering wheels of the trailer moved automatically in a desired direction and to a desired degree when the vehicle is driven forwardly or rearwardly.

10. In a trailer steering mechanism, selective means for actuating the steering wheels of a trailer in a desired direction and to varying degrees relative to the body movement of a vehicle to which the trailer is connected.

11. In a trailer steering mechanism, gear actuated means connected between a vehicle and trailer for automatically moving the steering wheels of the trailer proportionally to the body movement of the vehicle when moving around a curve; and selective means for varying the direction of movement of the trailer wheels relative to the movement of the vehicle.

12. In a trailer steering mechanism, gear actuated means connected between a vehicle and trailer for automatically moving the steering wheels of the trailer proportionally to the body movement of the vehicle when moving around a curve; and selective means for varying the direction and degree of movement of the trailer wheels relative to the movement of the vehicle.

In witness whereof, I hereunto set my signature.

J. ERNEST BECKER.